(12) United States Patent
Stoia et al.

(10) Patent No.: US 8,745,987 B2
(45) Date of Patent: Jun. 10, 2014

(54) LATE LEAN INJECTION MANIFOLD

(75) Inventors: Lucas John Stoia, Taylors, SC (US);
Jonathan Hale Kegley, Greer, SC (US);
Crystal McGee McConnaughhay,
Greenville, SC (US); Bryan Wesley Romig, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 12/914,537

(22) Filed: Oct. 28, 2010

(65) Prior Publication Data
US 2012/0102958 A1 May 3, 2012

(51) Int. Cl.
*F02C 7/228* (2006.01)

(52) U.S. Cl.
USPC ............. 60/739; 60/733; 60/740; 60/746

(58) Field of Classification Search
USPC ........ 60/739, 740, 746, 733; 431/8, 278, 350, 431/354
See application file for complete search history.

(56) References Cited

U.S. PATENT DOCUMENTS

| | | | | |
|---|---|---|---|---|
| 2,589,495 A | * | 3/1952 | Hess et al. | 432/123 |
| 2,629,225 A | * | 2/1953 | Ammann | 60/248 |
| 2,690,648 A | * | 10/1954 | Hiscox et al. | 60/739 |
| 3,147,594 A | * | 9/1964 | Hill et al. | 60/739 |
| 3,989,443 A | * | 11/1976 | Campbell | 431/8 |
| 4,802,334 A | * | 2/1989 | Eder et al. | 60/764 |
| 4,862,693 A | * | 9/1989 | Batakis et al. | 60/739 |
| 5,211,005 A | * | 5/1993 | Hovnanian | 60/800 |
| 6,047,550 A | | 4/2000 | Beebe | |
| 6,178,751 B1 | * | 1/2001 | Shekleton et al. | 60/736 |
| 6,192,688 B1 | | 2/2001 | Beebe | |
| 6,732,531 B2 | * | 5/2004 | Dickey | 60/794 |
| 6,868,676 B1 | | 3/2005 | Haynes | |
| 7,568,344 B2 | * | 8/2009 | Lincourt | 60/739 |
| 8,037,688 B2 | * | 10/2011 | Hagen et al. | 60/733 |
| 8,544,276 B2 | * | 10/2013 | Terada et al. | 60/746 |
| 2008/0092547 A1 | * | 4/2008 | Lockyer et al. | 60/757 |

FOREIGN PATENT DOCUMENTS

EP    1752709 A2    2/2007

* cited by examiner

*Primary Examiner* — Ehud Gartenberg
*Assistant Examiner* — Lorne Meade
(74) *Attorney, Agent, or Firm* — Cantor Colburn LLP (57) ABSTRACT

A late lean injection (LLI) manifold is provided and includes a central nozzle and first and second side nozzles positioned at circumferential locations defined around a vessel, a connector, a first leg, to which the connector is connected, formed to define a tube extending from the central nozzle to the first side nozzle such that fuel is communicable between the connector, the central nozzle and the first side nozzle and a second leg. The second leg is formed to define a tube extending from the central nozzle to the second side nozzle such that the fuel is communicable between the central nozzle and the second side nozzle.

10 Claims, 6 Drawing Sheets

LATE LEAN INJECTION MANIFOLD

BACKGROUND OF THE INVENTION

The subject matter disclosed herein relates to a late lean injection (LLI) manifold.

In gas turbine engines, mixtures of fuel and gas are combusted within a combustor disposed upstream from a transition piece and a turbine to produce high energy fluids from which mechanical energy can be derived for the generation of power and electricity. The high energy fluids are continually reused until significant levels of power generation cannot be derived at which point they are exhausted into the atmosphere. This exhaust often includes pollutants produced during the combustion, such as nitrous oxides (NOx) and carbon monoxide (CO).

Efforts have been expended to reduce the amount of pollutants produced by the combustion processes and include the development of late lean injection (LLI). LLI involves the injection of combustible materials into the flow of the high energy fluids at a location downstream from the normal combustion zone in the combustor. This downstream location could be defined as a section of the combustor liner or at a section of the transition piece. In any case, the combustible materials injected at this location increase temperature and energy of the high energy fluids and lead to increased consumption of CO and little to no significant increase in NOx for reasonable levels of LLI fuel flow.

In order to build LLI combustors or to refit currently operating combustors for LLI operations it has been necessary to employ relatively complex fuel and/or gas lines and to form holes in combustor liners and/or transition pieces by which LLI fuel can be injected. There are, however, significant mechanical challenges in routing fuel into the hot compressor discharge plenum and delivering it to the combustor in an effective, robust and durable way.

BRIEF DESCRIPTION OF THE INVENTION

According to one aspect of the invention, a late lean injection (LLI) manifold is provided and includes a central nozzle and first and second side nozzles positioned at circumferential locations defined around a vessel, a connector, a first leg, to which the connector is connected, formed to define a tube extending from the central nozzle to the first side nozzle such that fuel is communicable between the connector, the central nozzle and the first side nozzle and a second leg formed to define a tube extending from the central nozzle to the second side nozzle such that the fuel is communicable between the central nozzle and the second side nozzle.

According to another aspect of the invention, a nozzle to inject late lean injection (LLI) fuel into a vessel of a gas turbine engine is provided and includes a head formed to define a toroidal chamber receptive of LLI fuel, a radially outward section of a radial injection hole and fuel holes by which the toroidal chamber and the radial injection hole are fluidly communicative, a patch fixedly attachable to the vessel and formed to define a radially inward section of the radial injection hole and a neck supportively interposed between the patch and the head and formed to define a radially intermediate section of the radial injection hole by which the radially outward and inward sections of the radial injection hole fluidly communicate.

According to yet another aspect of the invention, a late lean injection (LLI) manifold assembly for a vessel of a gas turbine engine is provided and includes fuel conduits to transport LLI fuel to hole locations defined at the vessel, nozzles respectively fixed to the vessel at the hole locations, each nozzle being formed to define a radial injection hole, a toroidal chamber surrounding the radial injection hole and fuel holes by which the toroidal chamber and the radial injection hole are fluidly communicative and a manifold, fluidly coupled to the fuel conduits for reception of the LLI fuel and to the nozzles for delivery thereof to the respective toroidal chambers, the manifold including legs deformable by bending/flexing about radially translatable axes.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
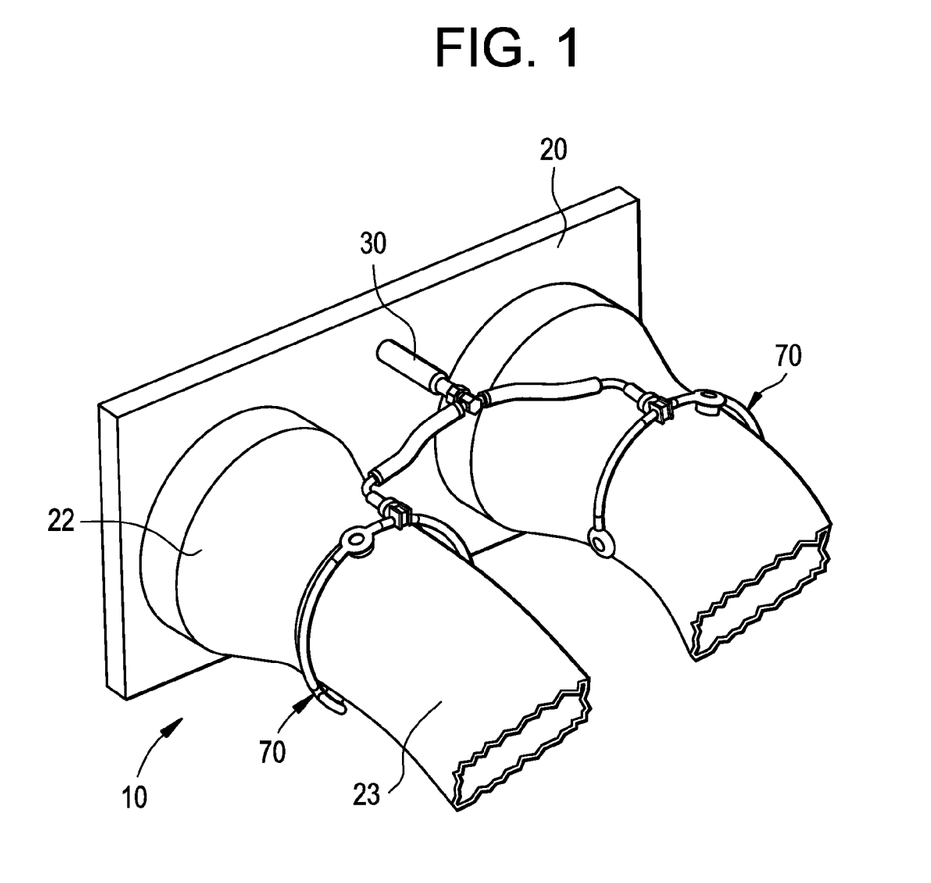
FIG. 1 is a perspective view of transition pieces of a gas turbine engine.

With reference to FIG. 1, a late lean injection (LLI) manifold assembly 10 for use with, for example, a gas turbine engine is provided as a relatively simple assembly for performing LLI operations that can be built into new combustors or retrofitted onto currently operating combustors. It will be understood that the gas turbine engine includes a combustor having a combustor liner formed to define a primary combustion zone in which primary combustion operations are conducted to produce high energy fluids from the combustion of fuel and/or gas. These high energy fluids are then directed into and through a transition piece that leads to a turbine in which mechanical energy can be derived from the high energy fluids. In addition, LLI fuel is injected into the combustion liner and/or the transition piece at a location that is defined downstream from the main combustion zone. At this location, the injected LLI fuel combusts and thereby increases temperature and energy of the high energy fluids.

As described above, the LLI fuel can be injected into either or both of the combustion liner or the transition piece to achieve LLI related effects. However, for purposes of clarity and brevity, only the injection of LLI into the transition piece will be described below. It is to be understood however, that the description can be applicable to combustor liner injection with little to no modification.

As shown in FIG. 1, the LLI manifold assembly 10 is disposed proximate to a wrapper component 20. The wrapper component 20 axially delimits a transition piece zone from a combustor zone of a gas turbine engine such that, for example, compressor discharge casing (CDC) air can be contained in and around the transition piece zone. Flow sleeves 22 protrude in the aft direction from the wrapper component 20 and fit closely with vessels, such as transition pieces 23, that are fluidly coupled to combustors disposed upstream from the wrapper component 20 to thereby receive high energy fluids produced from combustion operations.

With the LLI manifold assembly 10 disposed proximate to the wrapper component 20, a plurality of fuel conduits 30 are provided to transport LLI fuel through the wrapper component 20 toward dilution hole locations of each transition piece 23. The dilution hole locations are defined between mating edges of each transition piece 23.

Figure 2:
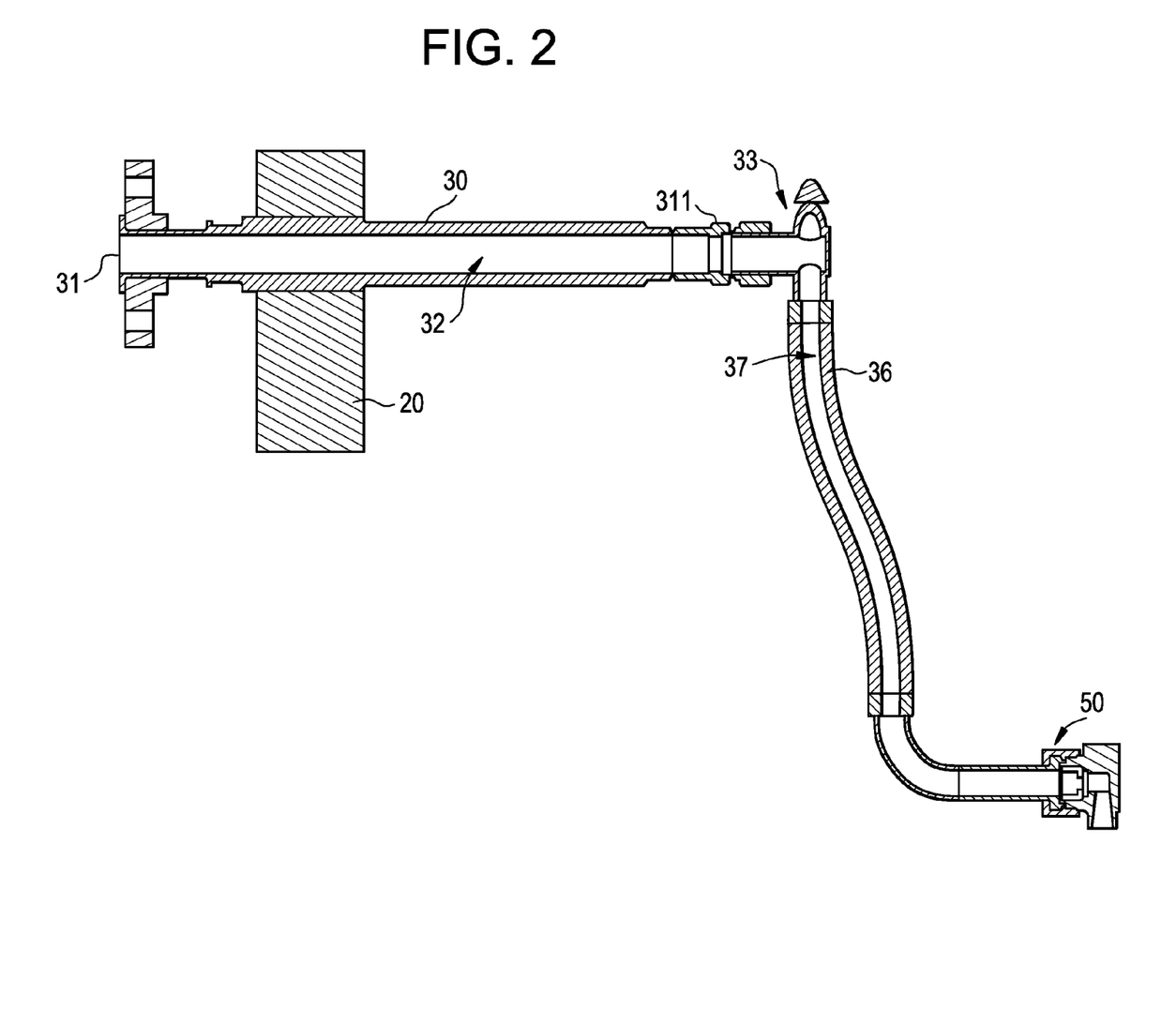
FIG. 2 is a side view of a penetration component and routing components.

With reference to FIG. 2, the plurality of fuel conduits 30 includes a penetration component 31 extending axially through the wrapper component 20, a splitter 33, which is operably disposed at an end of the penetration component 31 and routing components 36. The penetration component 31 extends axially through the wrapper component 20 with seals provided around its outer walls to prevent leakage and is formed to define a tubular conduit 32 along which the LLI fuel is transportable. An end 311 of the penetration component 31 is axially adjustable to permit on site adjustments.

Figure 6:
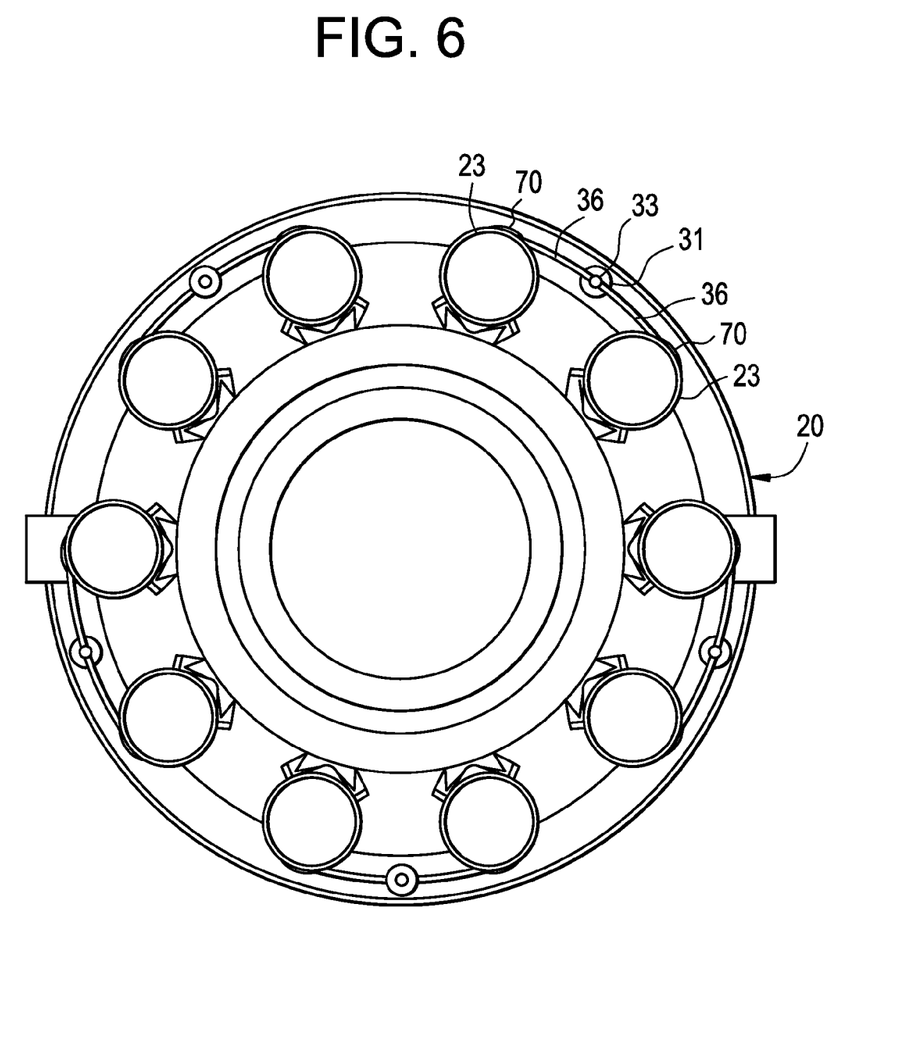
FIG. 6 is an axial view of the gas turbine engine of FIG. 1.

In many cases, the combustor and the transition piece 23 of a gas turbine engine will be plural in number with the pluralities of each arrayed about a common longitudinal axis, such as in a can-annular combustor array. For example, as shown in FIGS. 1 and 6, 10 combustors and 10 transition pieces 23 can be arranged in a substantially circular or ovoid arrangement or some other similar regular or irregular arrangement. In these cases, each LLI manifold assembly 10 can be employed to deliver LLI fuel to pairs of transition pieces 23 with the penetration component 31 circumferentially disposed between adjacent transition pieces 23. That is, the end 311 of the penetration component 31 may be coupled to the splitter 33, which is in turn coupled to routing components 36. In accordance with further embodiments, the numbers of combustors and transition pieces 23 are increased or decreased and, in accordance with still further embodiments, it is to be understood that the numbers of combustors and transition pieces 23 need not be the same.

The routing components 36 are forward-most ones of the plurality of fuel conduits 30 and form a T-shaped connection with the penetration component 31. The routing components 36 are plural in number, are formed to define routing conduits 37 and serve to transport the LLI fuel through the routing conduits 37 from the splitter 33 to adjacent LLI manifolds 10.

In accordance with further embodiments, it is to be understood that more or less combustors and transition pieces 23 can be arrayed and that each LLI manifold assembly 10 can be provided with association with 1, 2 or more combustors and transition pieces 23 and/or connected with one or more other LLI manifold assemblies 10. Where a 1:1 relationship is provided, however, it is necessary to have a higher number of penetrations of the wrapper component 20 than in instances of 1:2 relationships. Conversely, for 1:4 relationships, the routing components 36 are required to be relatively complex as some routing components 36 will be disposed along relatively short distances (e.g., those leading to adjacent transition pieces 23) while others will be disposed along relatively long distances (e.g., those leading to distal transition pieces 23). This may require that the former routing components 36 be provided with slack so that the lengths of all the routing components 36 will be substantially similar.

A T-connection module 50 may be provided at the end of the routing components 36 such that the routing components 36 can deliver LLI fuel to LLI manifolds 70 of each transition piece 23.

Each transition piece 23 may be formed to define 3 or more hole locations, such as dilution hole locations, which are circumferentially separated from one another by substantially similar circumferential distances or, in some cases, non-uniform circumferential distances. As such, the CDC air contained with the transition piece zone can be injected into the transition pieces 23.

Figure 3:
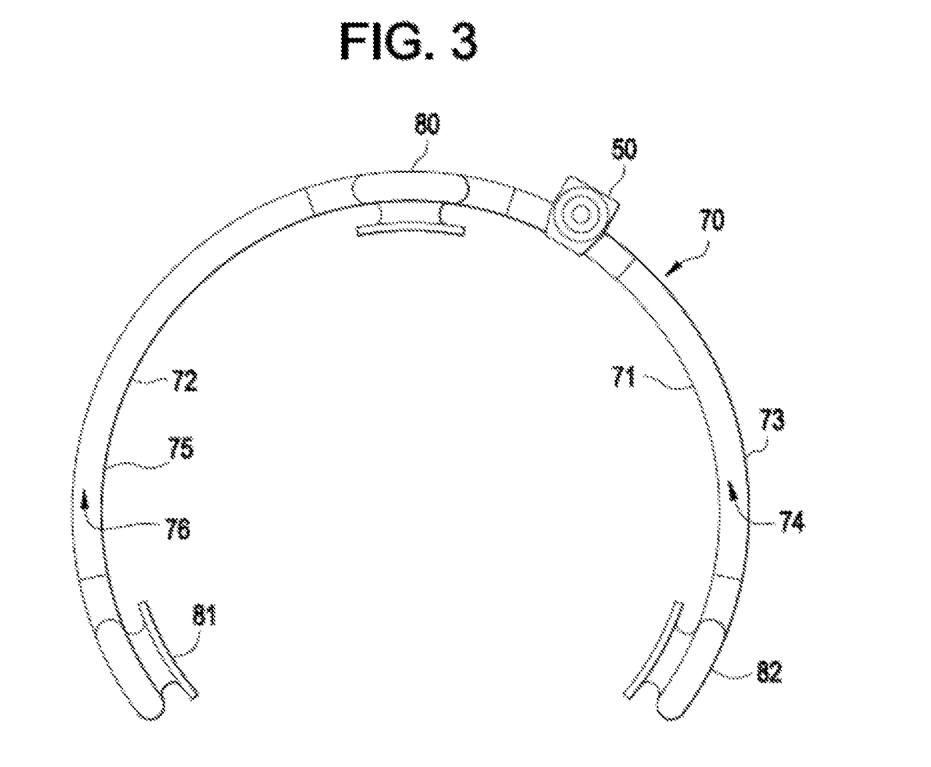
FIG. 3 is an axial view of nozzles and a late lean inject manifold.
Figure 4:
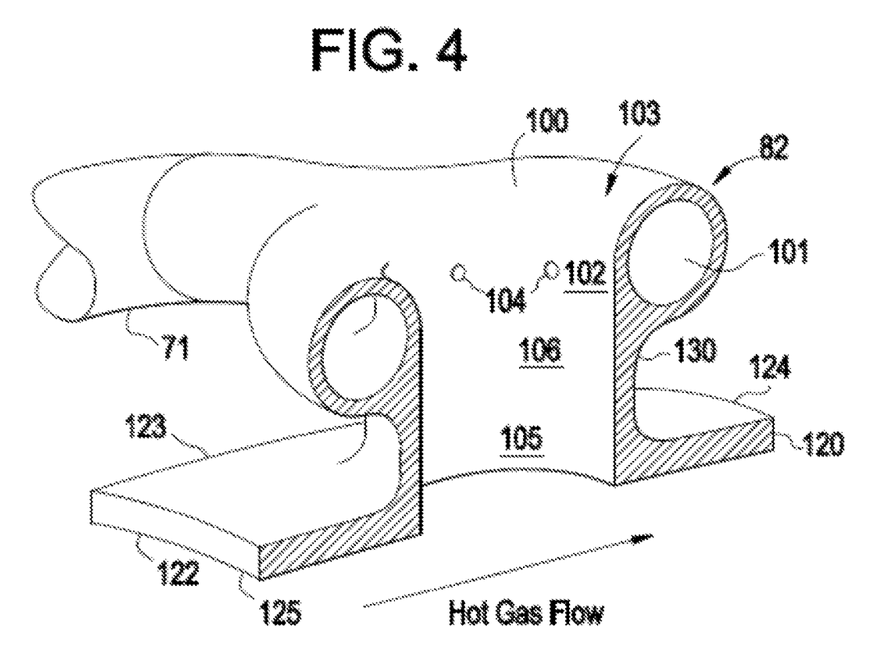
FIG. 4 is a perspective view of one of the nozzles of FIG. 3.
Figure 5:
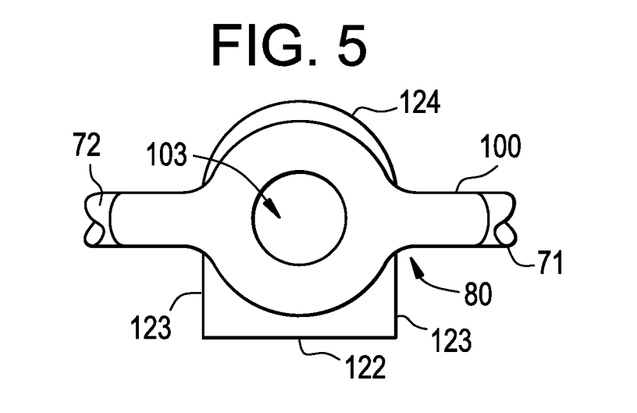
FIG. 5 is a radial view of another one of the nozzles of FIG. 3.

With reference to FIGS. 3, 4 and 5, a central nozzle 80 and first and second side nozzles 81 and 82 may be sealed to a particular transition piece 23 at the dilution hole locations of that transition piece 23. Each of the nozzles 80, 81 and 82 is formed to define a radial injection hole through which fluid (e.g., the CDC air) is injected into the transition piece 23, a toroidal chamber surrounding the radial injection hole and fuel holes by which the toroidal chamber and the radial injection hole are fluidly communicative. Each LLI manifold 70 is fluidly coupled to the corresponding routing component 36 via the T-connection module 50 for reception of the LLI fuel. The LLI manifolds are further coupled to each of the nozzles 80, 81 and 82 for delivery of the LLI fuel to the respective toroidal chambers.

With this construction, as the transition pieces 23 thermally expand and contract during turbine operations, the central nozzle 80 (see FIG. 3) translates in the radial dimension along with transition piece 23 thermal expansion. At the same time, the first and second legs 71, 72 of the LLI manifold 70 deform by bending/flexing about a common axis, which is defined through the central nozzle 80 even as the central nozzle 80 radially translates.

With reference to FIG. 4, which illustrates the second side nozzle 82 in particular, each nozzle 80, 81 and 82 includes similar features, such as a head 100, a patch 120 and a neck 130. The head 100 is formed to define a toroidal chamber 101 that is receptive of the LLI fuel from the corresponding one or both of the first and second legs 71, 72 of the LLI manifold 70, a radially outward section 102 of a radial injection hole 103 through which the CDC air is injected into the transition piece 23 and fuel holes 104 by which the toroidal chamber 101 and the radial injection hole 103 are fluidly communicative with each other.

As shown in FIGS. 4 and 5, the head 100 further includes integral bosses to which the first and second legs 71, 72 are connected. The central nozzle 80 will therefore include two such bosses, one on each side of the head 100. Similarly, the first and second side nozzles 81, 82 will each include a single such boss on only one side of their respective heads 100. The connections between the bosses and the first and the second legs 71, 72 may be achieved by, for example, welding (e.g., butt welding).

The patch 120 is sealed to the body of the transition piece 23 and is formed to define a radially inward section 105 of the radial injection hole 103. The neck 130 is supportively interposed between the patch 120 and the head 100. As such, the neck is formed to define a radially intermediate section 106 of the radial injection hole 103 by which the radially outward section 102 and the radially inward section 105 of the radial injection hole 103 fluidly communicate with each other.

The fuel holes 104 may be defined in an annular array about the radial injection hole 103. This annular array may be circular or ovoid, flat/planar or staggered with the fuel holes 104 being substantially uniformly separated from one another or non-uniformly separated from one another. Where the fuel holes 104 are non-uniformly separated from one another, the fuel holes 104 may be separated by repeating varied intervals or concentrated in a local circumferential location.

As the CDC air is injected into the transition piece 23, a flow strength or momentum of the airflow tends to entrain the flow of the LLI fuel through the fuel holes 104. In this way, the CDC air and the LLI fuel can be substantially mixed with hot gas flow through the transition piece 23 as shown in FIG. 4. Moreover, continual flow of the LLI fuel can be maintained and otherwise controlled such that LLI operations can be conducted with relatively high degrees of control.

The dilution holes formed in the transition piece 23 may be machined in an axial direction from the transition piece 23 edge to form a recess. The patch 120 is formed to tightly fit into this recess. To this end, the patch 120 is a generally planar member coupled to the neck 130 having a thickness substantially similar to that of the transition piece 23.

The patch 120 has a substantially straight first edge 122, substantially straight side edges 123 and a curved edge 124. The side edges 123 and the curved edge 124 tightly mate with corresponding edges of the recess. In addition, the patch 120 is provided with a contour 125 that is substantially similar to a corresponding contour of the transition piece 23 such that the patch 120 and the transition piece 23 form a generally annular combined body through which the hot gas flow propagates.

The patch 120 may be sealed to the transition piece 23 by, for example, welding (e.g., butt welding), such that CDC air is prevented from entering the transition piece 23 between edges of the transition piece 23 and the corresponding edges of the patch 120. In alternative embodiments, the patch 120 may also be sealed via certain adhesives and/or additional structural supports. As a result of the sealing between the patch 120 and the transition piece 23, the patch 120 is integrally connected to the transition piece 23 and, as such, during thermal expansion and contraction of the transition piece 23, the patch 120 will remain sealed to the transition piece 23 at the location of the dilution holes. Thus, stresses associated with thermal deformation will be substantially constrained within the first and second legs 71, 72 of the LLI manifold 70 and strain will be prevented.

The first leg 71 includes a tubular sidewall 73 formed to define a tubular conduit 74 through which LLI fuel is supplied from the connection module 50 to the central nozzle 80 and the second side nozzle 82. Similarly, the second leg 72 includes a tubular sidewall 75 formed to define a tubular conduit 76 through which LLI fuel is supplied from the central nozzle to the first side nozzle 81.

The first and second legs 71, 72 each have a circumferential curvature that substantially mimics the circumferential curvature of the corresponding transition piece 23. The first and second legs 71, 72 may include further curvatures in the radial and axial dimensions as well in order to account for the possible presence of other gas turbine engine components and to increase or decrease structural rigidity of the LLI manifold 70. In general, however, the first and second legs 71, 72 are configured to deform by bending/flexing about the central nozzle 80 and the first and second side nozzles 81, 82 even as the central nozzle 80 and the first and second side nozzles 81, 82 radially translate during thermal expansion and contraction of the transition piece 23.

In accordance with aspects of the invention, as described above, LLI fuel delivered to the LLI manifold 70 via the connection module 50 takes a pressure drop across a pre-orifice and distributes LLI fuel to each of the dilution holes by way of the nozzles 80, 81 and 82. The relatively high momentum of the CDC air entrains the LLI fuel and drives it into the core combustion hot gas flow. Meanwhile, thermal deformation is accommodated without development of relatively high strain. In general, the combustion liner or the transition piece 23 is of a considerably higher temperature than the LLI manifold 70 and, therefore, wants to grow radially in relationship to its own centerline more than the LLI manifold 70. However, since the LLI manifold 70 includes the arced tubing of the first and second legs 71, 72, the arced tubing simply flexes to accommodate the deformed combustor liner or transition piece 23.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. Multiple late lean injection (LLI) manifolds for a gas turbine engine comprising multiple combustors and multiple transition pieces respectively disposed downstream from corresponding ones of the multiple combustors, each of the multiple LLI manifolds comprising:
   a central nozzle and first and second side nozzles positioned at circumferential locations defined around a downstream portion of a corresponding one of the multiple combustors or transition pieces;
   a connector receptive of fuel for the corresponding one of the multiple LLI manifolds from a penetration component fluidly connecting two adjacent LLI manifolds of the multiple LLI manifolds; and
   a first leg to which the connector is connected and a second leg formed to define tubes extending from the central nozzle to the first and second side nozzles, respectively, such that fuel is communicable between the connector, the central nozzle and the first and second side nozzles.

2. The multiple LLI manifolds for the gas turbine engine according to claim 1, wherein the central nozzle and the first and second side nozzles are provided in a group of three or more nozzles for each of the multiple LLI manifolds.

3. The multiple LLI manifolds for the gas turbine engine according to claim 1, wherein the central nozzle and the first and second side nozzles are arranged with uniform spacing for each of the multiple LLI manifolds.

4. The multiple LLI manifolds for the gas turbine engine according to claim 1, wherein the central nozzle and the first and second side nozzles are arranged with non-uniform spacing for each of the multiple LLI manifolds.

5. The multiple LLI manifolds for the gas turbine engine according to claim 1, wherein the connector of each of the multiple LLI manifolds comprises a T connection.

6. The multiple LLI manifolds for the gas turbine engine according to claim 1, wherein the first and second legs of each of the multiple LLI manifolds have a curvature mimicking a curvature of the corresponding one of the multiple combustors or transition pieces.

7. The multiple LLI manifolds for the gas turbine engine according to claim 1, wherein radial translation of the central nozzle and the first and second side nozzles occurs during thermal expansion of the corresponding one of the multiple combustors or transition pieces.

8. The multiple LLI manifolds for the gas turbine engine according to claim 7, wherein for each of the multiple LLI manifolds the first and second legs are configured to deform about a common axis defined through the radially translating central nozzle.

9. The multiple LLI manifolds for the gas turbine engine according to claim 1, wherein the gas turbine engine further comprises:
- a wrapper component axially delimiting a transition piece zone, including the downstream portions of the multiple combustors and the multiple transition pieces, from a combustor zone,
- the wrapper component being configured to contain compressor discharge casing (CDC) air in the transition piece zone.

10. The multiple LLI manifolds for the gas turbine engine according to claim 9, wherein the penetration component penetrates axially through the wrapper component.

* * * * *